(12) United States Patent
Yamasaki et al.

(10) Patent No.: US 7,220,005 B2
(45) Date of Patent: May 22, 2007

(54) PROJECTION TYPE VIDEO DISPLAY APPARATUS

(75) Inventors: Futoshi Yamasaki, Yokohama (JP); Masahiko Yatsu, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 169 days.

(21) Appl. No.: 11/040,730

(22) Filed: Jan. 21, 2005

(65) Prior Publication Data

US 2005/0179873 A1 Aug. 18, 2005

(30) Foreign Application Priority Data

Jan. 21, 2004 (JP) .............................. 2004-012595

(51) Int. Cl.
  G03B 21/26 (2006.01)
  G03B 21/28 (2006.01)
  G03B 21/16 (2006.01)
  G03B 21/20 (2006.01)
  H04N 5/74 (2006.01)
  G02F 1/1335 (2006.01)
  F21V 7/20 (2006.01)
  G02B 6/00 (2006.01)

(52) U.S. Cl. ............................ 353/31; 353/37; 353/60; 353/61; 353/84; 353/94; 353/99; 353/102; 348/748; 348/750; 348/757; 348/759; 362/555; 362/560; 362/561; 362/231; 362/345; 349/7; 349/161; 359/34; 359/629; 385/133

(58) Field of Classification Search ................. 353/94, 353/20, 30, 31, 33, 34, 37, 52, 57, 58, 60, 353/61, 91, 82, 84, 98, 99, 102, 81; 348/739, 348/744, 748, 759; 362/551, 555, 559, 560, 362/561, 227, 231, 235, 241, 243, 247, 317, 362/341, 345; 385/15, 34, 36, 133; 349/5, 349/7–9, 34, 36, 161; 359/34, 618, 629, 359/638–640
See application file for complete search history.

(56) References Cited

U.S. PATENT DOCUMENTS

| 7,004,586 B2* | 2/2006 | Morinaga ..................... 353/20 |
| 2003/0098956 A1* | 5/2003 | Chang et al. .................. 353/52 |
| 2003/0231497 A1* | 12/2003 | Sakata et al. ............... 362/341 |
| 2004/0057027 A1* | 3/2004 | Tani ............................ 353/102 |
| 2006/0044523 A1* | 3/2006 | Teijido et al. ................. 353/53 |

FOREIGN PATENT DOCUMENTS

JP 2003-329978 11/2003

* cited by examiner

*Primary Examiner*—W. B. Perkey
*Assistant Examiner*—Rochelle Blackman
(74) *Attorney, Agent, or Firm*—Townsend and Townsend and Crew LLP (57) ABSTRACT

An object of the invention is to achieve a high intensity, a compact structure, a cost reduction and a heat radiation of a liquid crystal panel, in a projection type video display apparatus employing a combination of LED light sources and a light pipe. The light pipe is formed in a hollow type so as to be utilized as a cooling wind path. Further, a permeable or reflective baffle plate is provided within the light pipe. Further, the light pipe is formed by coating a mirror on an inner surface of an optical case integrally formed by fixing optical parts. Further, a dichroic mirror is arranged in an LED light source outgoing surface.

19 Claims, 4 Drawing Sheets

PROJECTION TYPE VIDEO DISPLAY APPARATUS

INCORPORATION BY REFERENCE

The present application claims priority from Japanese application JP2004-012595 filed on Jan. 21, 2004, the content of which is hereby incorporated by reference into this application.

BACKGROUND OF THE INVENTION

The present invention relates to a projection type video display apparatus employing a video display element such as a transmission type liquid crystal, a reflection type liquid crystal, a digital micromirror device (DMD) constituted by a micro mirror or the like.

There has been known a projection type video display apparatus such as a liquid crystal projector or the like which applies a light from a light source to a video display element such as a liquid crystal panel or the like, and enlarges and projects an image on the liquid crystal panel. In recent years, in accordance with a high intensity of a light emitting diode (hereinafter, refer briefly to "LED"), there has been considered to apply the LED as a light source of the projection type graphic image display apparatus by effectively utilizing a high color purity, a long service life and a good lighting property thereof.

As a new aspect at a time of applying the LED light source to the projection type video display apparatus, for example, one transmission type liquid crystal panel is used, and three LED forming the light source are used in correspondence to three elementary colors. Further, a color display can be achieved by synchronizing a motion of the liquid crystal panel and a sequential lighting of three color LED. This structure is disclosed in JP-A-2003-329978.

SUMMARY OF THE INVENTION

The LED light source has the feature that the color purity is high, and the like, however, has a problem that a brightness is not sufficient as the light source for the projection type video display apparatus in comparison with a high pressure mercury lamp or the like. In an application to the projection type video display apparatus, generally as shown in the patent document 1 mentioned above, an improvement of the brightness is intended by arranging a plurality of LED. Accordingly, a temperature on the video display element (for example, the liquid crystal panel) on which the illumination light of the LED light source is irradiated becomes higher in the same manner as a case of the conventional lamp.

In this case, in the patent document 1 mentioned above, for the purpose of making the structure compact, thin and light, there has been proposed a structure in which an outgoing side of a rod lens (one kind of kaleidoscope type integrators uniformizing the light) arranged so as to be closely contacted with a front surface of the LED, and the liquid crystal panel serving as the video display element are arranged in a state of being closely contacted.

In this case, since the temperature of the liquid crystal panel becomes high as mentioned above, there is a tendency that a cooling of the liquid crystal panel is insufficient, and there is a risk that a problem that the service life of the liquid crystal panel is shortened.

Further, it is important to simplify the structure so as to achieve a low cost. In the patent document 1 mentioned above, since the rod lenses are respectively provided in correspondence to the LED constituting an LED light source array, a structure of an illumination optical system conducting the illumination light from the LED to the liquid crystal panel is complicated, and it is hard to achieve a further low cost.

The present invention is made by taking the matter mentioned above into consideration, and an object of the present invention is to provide a projection type video display apparatus provided with a light pipe which can cool a liquid crystal panel by a simple structure.

In order to achieve the object mentioned above, the present invention is structured as described in claims. In other words, a first hole and a second hole are provided in a wall surface near an incoming side opening portion of a light pipe, or a first hole is provided in a wall surface near in incoming side opening portion of the light pipe and a second hole is provided in a wall surface near an outgoing side opening portion of the light pipe. Accordingly, it is possible to vent a cooling wind into an inner portion of the light pipe by using the first and second holes, thereby cooling the liquid crystal panel serving as the video display element.

In particular, in the case that the first and second holes are provided near the incoming side opening portion of the light pipe, a baffle plate is provide in the inner portion of the light pipe for forming a wind path of an intake air and an exhaust air. Accordingly, it is possible to make a cooling effect higher.

Further, the light pipe is structured by forming a mirror reflecting the light to an inner wall surface of an optical case serving as a structure body holding the illumination optical system irradiating the light from the light source to the liquid crystal panel. Accordingly, it is possible to achieve a low cost.

In accordance with the present invention, it is possible to make the projection type video display apparatus low cost.

Other objects, features and advantages of the invention will become apparent from the following description of the embodiments of the invention taken in conjunction with the accompanying drawings.

DETAILED DESCRIPTION OF PREFERRED EMBODIMENTS

A description will be in detail given below of a best mode in accordance with the present invention with reference to the accompanying drawings. In this case, in each of the drawings, the same reference numerals are attached to the constituting elements having the same function, and a repeated description about the elements once described will be omitted in order to avoid a complication.

Embodiment 1

Figure 1:
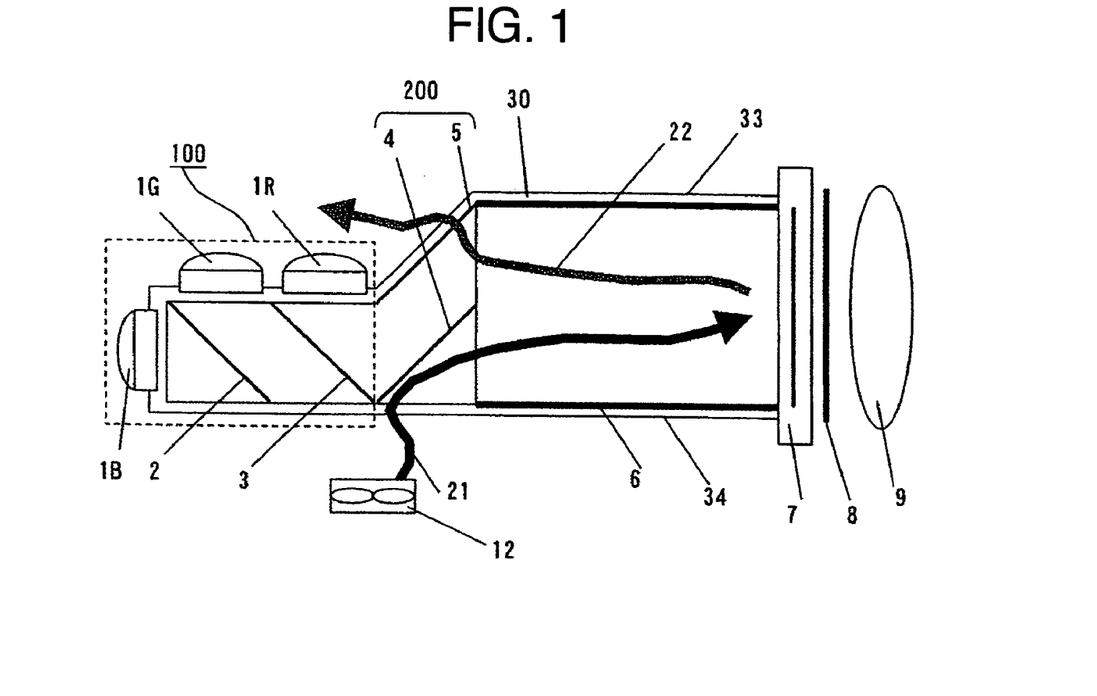
FIG. 1 is a top elevational view of an outline structure of an optical system of a projection type video display apparatus showing a first embodiment.
Figure 2:
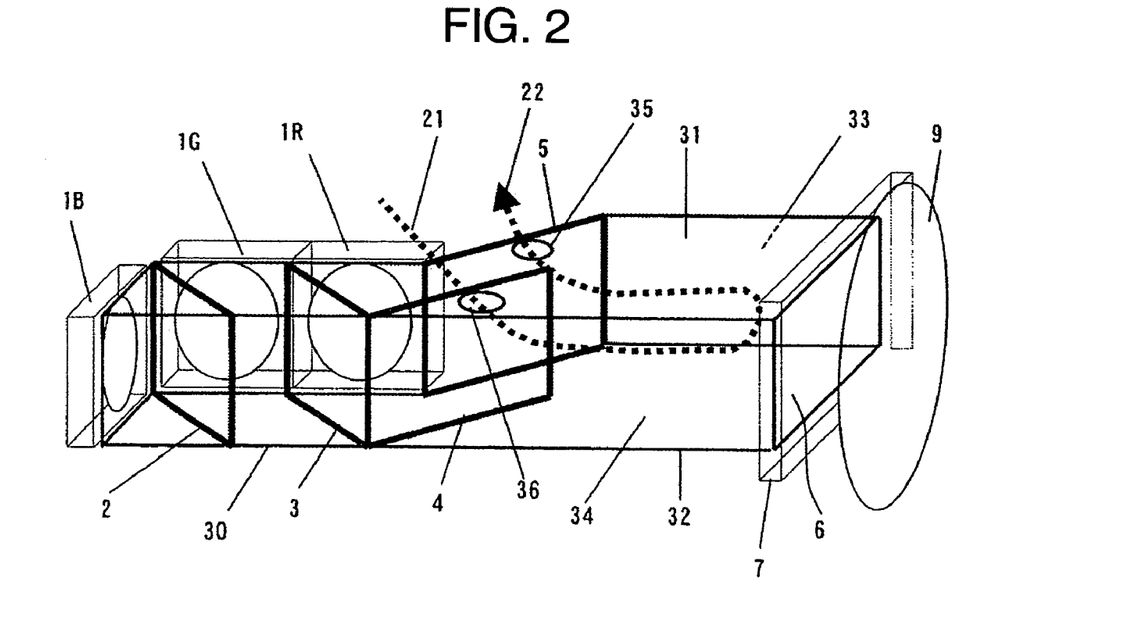
FIG. 2 is a perspective view of FIG. 1.

FIG. 1 is a top elevational view of an outline structure of an optical system of a projection type video display apparatus showing a first embodiment in accordance with the present invention, and FIG. 2 is a perspective view of FIG. 1. In FIGS. 1 and 2, reference symbols 1R, 1G and 1B respectively denote LED light sources emitting a red light, a green light and a blue light, and reference numerals 2 and 3 denote first and second combined mirrors to which a dichroic coat is applied. Reference numeral 4 and 5 denote a polarization separating mirror and a total reflection mirror constituting a polarizing and converting means 200 for aligning a direction of polarization with a predetermined direction of polarization, reference numeral 6 denotes a light pipe serving as a kaleidoscope type integrator in which an inner portion is hollow, reference numeral 7 denotes a transmission type liquid crystal panel, reference numeral 8 denotes an outgoing side polarizing plate, and reference numeral 9 denotes a projection lens. Reference numeral 30 denotes an optical case serving as a casing (a structure body) which stores an illumination optical system conducting an illumination light from the LED light source to a liquid crystal panel, reference numeral 31 denotes an upper surface of the optical case 30, reference numeral 32 denotes a lower surface of the optical case 30, reference numerals 33 and 34 denote a side surface of the optical case 30, and reference numeral 12 denotes a cooling fan. In this case, the respective optical parts are integrally held by the optical case 30.

In the present embodiment, the LED light sources 1R, 1G and 1B are respectively driven so as to be lighted in a time division manner for a predetermined period by a lighting drive circuit (not shown), and are lighted in the time division manner, for example, lighting the LED light source 1R→lighting the LED light source 1G→lighting the LED light source 1B. The first combined mirror 2 transmits a blue light (hereinafter, refer to B light) from the LED light source 1B, and reflects a green light (hereinafter, refer to G light) from the LED light source 1G so as to emit to a side of the liquid crystal panel 7. The second combined mirror 3 transmits the G light and the B light from the first combined mirror 2, and reflects a red light (hereinafter, refer to R light) from the LED light source 1R so as to emit to a side of the liquid crystal panel 7. As mentioned above, in accordance with the present embodiment, one illumination light source 100 is structured by the LED light sources 1R, 1G and 1B, the first combined mirror 2 and the second combined mirror 3. In this case, the LED light source constituting the illumination light source 100 in accordance with the present embodiment is constituted by three LED light sources 1R, 1G and 1B in which a plurality of predetermined whole-colored LED are arranged, as is different from the LED light source in which a plurality of three elementary color LED shown in FIG. 1 of the patent document 1 mentioned above are arranged on one surface. In accordance with the structure mentioned above, it is possible to increase an area of light generation, and it is possible to improve a brightness of a projected image.

The light emitted from the illumination light source 100 constituted by the LED light sources 1R, 1G and 1B, the first combined mirror 2 and the second combined mirror 3 enters into the polarization separating mirror 4. The polarization separating mirror 4 is a part structured such that a high transmission coat (not shown) is applied to an incoming side on a glass substrate, a polarization separating coat (not shown) is applied to an outgoing side, and a half wavelength plate (not shown) is attached to an outgoing side surface. When the light passes through the polarization separating mirror 4, an S-polarized light wave (hereinafter, refer briefly to S wave) is reflected, and a P-polarized light wave (hereinafter, refer briefly to P wave) is transmitted. The transmitted P wave is converted into the S wave by the half wavelength plate (not shown) attached to the outgoing side f the polarization separating mirror 4, the S wave reflected by the polarization separating mirror 4 is reflected by the mirror 5, and both the lights enter into the light pipe 6 after being unified to the S wave. In other words, the polarization separating mirror 4 and the mirror 5 structure a polarization converting means 20 for aligning with the S wave.

The light entering into the light pipe 6 is conducted to the outgoing side after repeating the reflection at zero time to a plurality of times in correspondence to an incident angle and an incident position. The brightness distribution of the light becomes approximately uniform in an outgoing cross section by the reflection in the inner surface of the light pipe 6. The liquid crystal panel 7 is arranged in the outgoing surface of the light pipe 6 so as to be approximately closely contacted, and the image (an optical image) on the liquid crystal panel 7 formed by modulating a light intensity of the light having the uniform brightness distribution from the light pipe 6 by means of an image drive circuit (not shown) is enlarged and projected to a screen (not shown) or the like by a projection lens 9 after passing through an outgoing side polarizing plate 8.

In the present structure, the incoming side polarizing plate (not shown) is attached to the incoming surface of the liquid crystal panel 7. In order to cool both the incoming side polarizing plate (not shown) and the liquid crystal panel 7, a cooling fan 12 is provided. A cooling wind from the cooling fan 12 is fed in the inner portion of the light pipe 6 from an intake hole 36 on the upper surface 31 of the optical case 30 provided in an upper side near the polarization separating mirror 4 as shown by an arrow 21, and cools the incoming side polarizing plate (not shown) and the liquid crystal panel 7. The cooling wind flows as shown by the arrow 21, cools the incoming side polarizing plate (not shown) and the liquid crystal panel 7 in the inner portion of the light pipe 6, thereafter passes through the light pipe 6 as shown by an arrow 22, and is exhausted from the exhaust hole 35 on the upper surface 31 of the optical case 30 provided in the upper side near the mirror 5.

In this case, in accordance with the present embodiment, the intake hole 36 and the exhaust hole 35 of the cooling wind are provided in the upper surface 31 in the upper portion of the polarization separating mirror 4 and the mirror 5 having the less incoming light, however, the structure is not limited to this. For example, the intake hole 36 and the exhaust hole 35 may be provided in the lower surface in the lower portion of the polarization separating mirror 4 and the mirror 5. Further, for example, the structure may be made such that a first hole is provided in the upper surface 31 in the upper portion of the polarization separating mirror 4, a second hole is provided in a little gap (not shown) formed between the light pipe 6 and the liquid crystal panel 7, and a wind path is formed in the inner portion of the light pipe by communicating the first and second holes, thereby cooling.

Next, a description will be given of the feature of the present invention for achieving a low cost. The light pipe forms a light tunnel in which all inner surfaces are constituted by mirrors and an inner portion is hollow, by combining four mirrors. On the contrary, in the present invention, the light pipe 6 is formed by utilizing the optical case 30 mentioned above. The optical case 30 is a holding structure for holding each of the mirror parts and integrally assembling the LED light sources 1R, 1G and 1B, the liquid crystal panel 7, the outgoing side polarizing plate 8, the projection lens 9 and the like. The light pipe 6 is formed by forming the mirror, for example, in accordance with a painting, in the inner wall portion originally holding the light pipe 6 in the optical case 30. The mirror can be formed in accordance with a coating in place of the painting. If a sufficient reflection factor is secured, the same efficiency can be achieved by a low cost in comparison with the light pipe employing a flat mirror.

As mentioned above, in accordance with the present embodiment, in the projection type video display apparatus which aligns the light from the illumination light source in the predetermined polarizing direction by the polarization converting means, uniformizes the light by the light pipe, and irradiates the light to the liquid crystal panel arranged in the outgoing side of the light pipe, the first hole and the second hole are provided in the optical case wall surface near the light pipe incoming side opening portion in the region which does not affect the polarization converting effect of the polarization converting means and the light uniformizing effect of the light pipe, or the first hole is provided in the optical case wall surface near the light pipe incoming side opening portion and the second hole is provided in the optical case wall surface near the light pipe outgoing side opening portion. Accordingly, it is possible to vent the cooling wind to the inner portion of the light pipe from the first hole and the second hole so as to cool the incoming side polarizing plate and the liquid crystal panel.

Further, it is possible to intend a cost reduction by forming the mirror in the inner wall surface of the optical case so as to form the light pipe.

In this case, the cooling fan 12 is not particularly limited in the present embodiment, however, in order to cool the liquid crystal panel 7, a centrifugal fan such as a sirocco fan or the like is effective. In other words, the cooling wind from the cooling fan 12 structured by the centrifugal fan is vent to the intake port 36 via a duct. The cooling wind can have a predetermined wind speed or more, and can reach the liquid crystal panel 7 so as to cool the liquid crystal panel 7.

Embodiment 2

Figure 3:
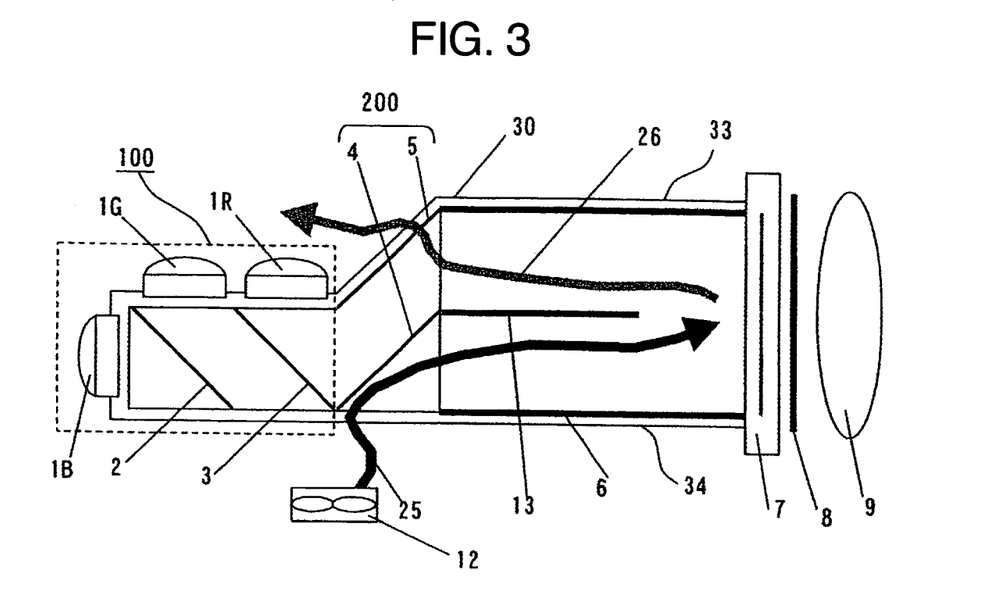
FIG. 3 is a top elevational view of an outline structure of an optical system of a projection type video display apparatus showing a second embodiment.

Next, a description will be given of a second embodiment in accordance with the present invention. FIG. 3 is a top elevational view of an outline structure of an optical system of a projection type video display apparatus showing a second embodiment. In the case that both of the intake hole and the exhaust hole are provided in the incoming side of the light pipe, the cooling wind collide with each other within the light pipe 6. In accordance with the second embodiment, in order to prevent the cooling efficiency from being lowered due to the above collision, as shown in FIG. 3, a baffle plate 13 is provided in the inner portion of the light pipe 6.

In FIG. 3, the baffle plate 13 forms a wind path of the cooling wind shown by an arrow 25 and an arrow 26 in the inner portion of the light pipe 6, and can efficiently cool the incoming side polarizing plate (not shown) and the liquid crystal panel 7. It is desirable that a length of the baffle plate 13 is at least equal to or more than one half of the length of the light pipe, in order to separate the wind path. Further, the baffle plate 13 is arranged along a direction of an optical axis at a position which approximately coincides with a side end portion of the light pipe in the polarization separating mirror 4. In accordance with this arrangement, it is possible to avoid the baffle plate 13 from shielding the light from the polarization converting means 200 as much as possible. In this case, in FIG. 3, the same reference numerals are attached to the elements having the same functions as those in FIGS. 1 and 2, and a repeated description thereof will be omitted in order to avoid a complication.

As the baffle plate 13, a glass plate having a high transmission coat applied thereto and having a high transmission factor may be effectively employed. However, even in the case of using a glass play to which the high transmission coat is not applied, the light incoming to the light pipe 6 from the illumination light source is eventually conducted to the outgoing side of the light pipe 6 without reference to the reflection factor. Accordingly, there is no problem, and a cost reduction can be effectively achieved. At this time, it is preferable to employ a glass based on a white glass having a small light absorption rather than a blue glass having a large light absorption.

Further, as the baffle plate 13, it is effective to employ a mirror having a high reflection factor in place of the permeable glass. The same effect as that obtained by narrowing the light pipe 6 can be obtained by employing the mirror, so that it is possible to achieve an improve uniformity of the brightness in the outgoing cross section, even if the entire length of the light pipe 6 is shortened. A description will be next given of a principle thereof.

The optical path of the light pipe 6 becomes narrow while keeping the length, by adding the baffle plate reflecting the light. The light enters into the light pipe 6 at a fixed angle, thereby achieving the uniformity of the brightness in the outgoing cross section on the basis of a plurality of reflections. However, if the light pipe becomes narrow under the fixed entire length, the reflecting number of the light is increased. As a result, even if the entire length is shortened, it is possible to apply a sufficient reflecting number of the light, and the uniformity of the brightness in the outgoing cross section is not deteriorated. In other words, it is possible to shorten the entire length so as to achieve the structure compact and low cost.

In the case that the effect of shortening the entire length is expected, it is preferable to make the length of the baffle plate 13 as large as possible within a range of being received in the inner portion of the light pipe 6, however, if the baffle plate is extended to the outgoing opening surface, there is a case that a shadow of the baffle plate comes out on the projection display. In order avoid this, and in order to effectively get the cooling wind on the surface of the liquid crystal panel 7 through corresponding to an original object, the structure is made, as shown in FIG. 3, such that the baffle plate 13 is not extended to the portion near the outgoing side of the light pipe 6. However, as mentioned above, since the baffle plate 13 is provided for separating the wind path of the cooling wind, it is desirable also in this case that the length thereof is equal to or more than one half of the light of the light pipe.

The reflection type (the mirror type) baffle plate in the projection type video display apparatus in accordance with the present invention is not limited to the projection type video display apparatus employing the LED light source as in the present embodiment, but can be effectively applied to a type employing a general high pressure mercury lamp or the like. On the basis of this application, it is possible to shorten the entire length of the light pipe. Of course, even in the projection type video display apparatus employing the general high pressure mercury lamp or the like, in the case that the inner portion of the hollow light pipe is formed as the wind path so as to be used for cooling, it goes without saying that the cooling effect can be improved by the baffle plate.

Further, in the present embodiment employing the baffle plate 13, the structure is not limited to a case that the cooling wind from the cooling fan is vent to the intake port, that is, the cooling fan is arranged in the upstream side of the wind path. In other words, even in the case that the cooling fan is arranged in the downstream side of the so-called wind path for discharging the cooling wind from the discharge port by the cooling fan, the present invention can be applied.

Embodiment 3

Figure 4:
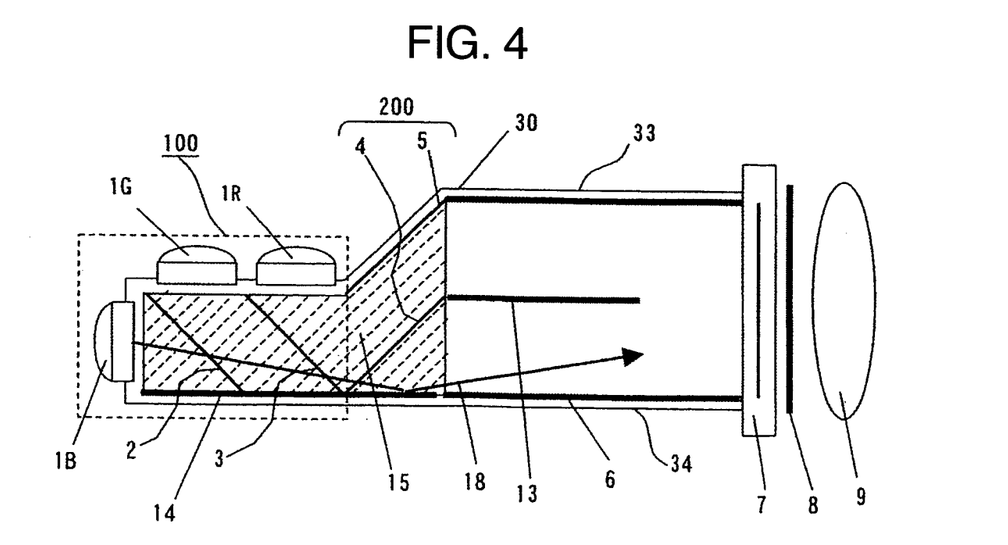
FIG. 4 is a top elevational view of an outline structure of an optical system of a projection type video display apparatus showing a third embodiment.

Next, a description will be given of a third embodiment. FIG. 4 is a top elevational view of an outline structure of an optical system of a projection type video display apparatus showing the third embodiment. In accordance with the third embodiment, when the light pipe 6 is formed by providing with the mirror on the inner wall surface of the optical case, for example, in accordance with the painting or the coating as mentioned above, an area of reflection is simultaneously expanded by providing with the mirror on the inner wall surface of the optical case in the other portion than the light pipe 6.

In FIG. 4, the inner wall (except the portion of the light pipe 6) of the optical case provided with the mirror for expanding the area of reflection corresponds to the inner wall portion of the upper surface 31 and the lower surface 32 of the optical case 30, and the inner wall portion of the side surface 34 in a side of the holding portion of the polarization separating mirror 4 opposing to the side surface 33 in which the LED light sources 1G and 1R are held, reference numeral 14 denotes an expanded reflection surface provided in the inner wall portion of the side surface 34, and reference numeral 15 denotes an expanded reflection surface provided in the inner wall portion of the upper surface 31 and the lower surface 32.

Since it is possible to effectively reflect the light which is originally diffused so as to be brought into contact with the inner surface of the optical case 30 and be absorbed, thereby conducting to the light pipe 6, on the basis of the expansion of the area of reflection in the other portion than the light pipe 6 in the manner mentioned above, it is possible to achieve a high intensity of the projected image at a lowest cost. FIG. 4 schematically shows an example of a condition that the light 18 outgoing from the LED light source 1B is effectively reflected by the expanded reflection surface 14 so as to be directed toward the light pipe 6.

In the present embodiment, the liquid crystal panel is used as the video display element, however, the arrangement of the expanded reflection surface intends to improve the brightness by increasing the light intensity incoming to the light pipe from the light source. Accordingly, the video display element is not limited to the liquid crystal panel in view of this meaning.

Embodiment 4

Figure 5A:
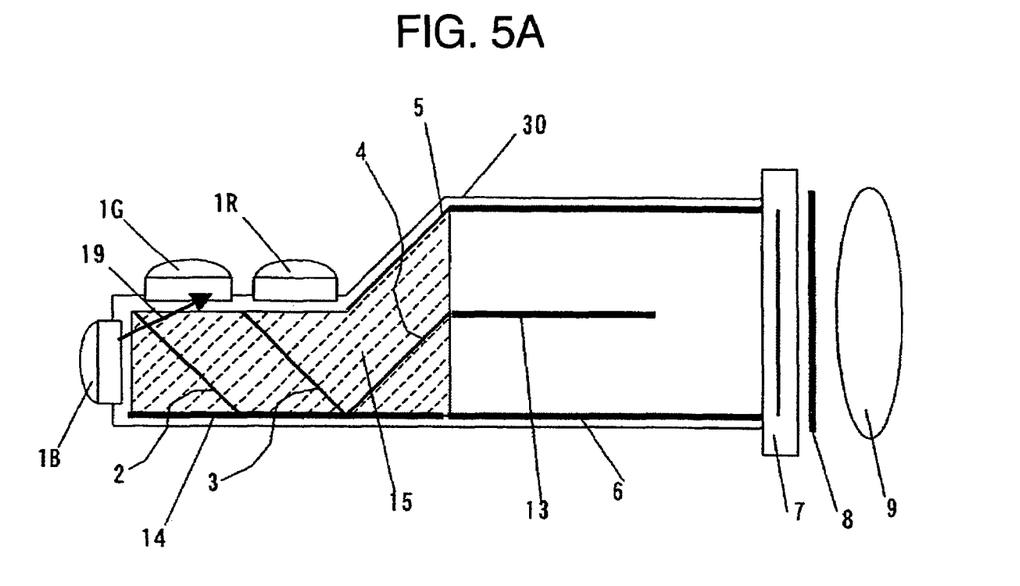
FIGS. 5A and 5B are top elevational views of an outline structure of an optical system of a projection type video display apparatus showing a fourth embodiment.
Figure 5B:
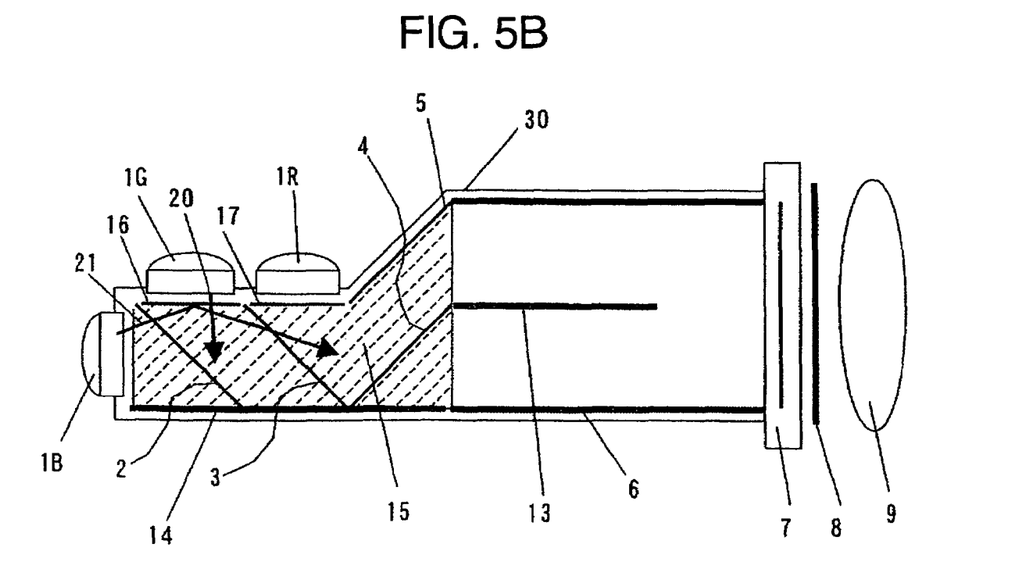

Next, a description will be given of a fourth embodiment in accordance with the present invention. FIGS. 5A and 5B are top elevational views of an outline structure of an optical system of a projection type video display apparatus showing the fourth embodiment. In accordance with the present invention, the structure is made, as shown in FIGS. 5A and 5B, such that the third embodiment shown in FIG. 4 is provided with a dichroic mirror 16 which reflects the B light to the front surface of the LED light source 1G and transmits the G light, and a dichroic mirror 17 which reflects the G light and the B light to the front surface of the LED light source 1R and transmits the R light. In accordance with the present embodiment, it is possible to achieve the high intensity by effectively utilizing the light from the LED light source 1B and 1G which is originally diffused and does not become effective. A description will be in detail given below of this structure with reference to FIGS. 5A and 5B.

In FIGS. 5A and 5B, FIG. 5A is the same as FIG. 4, and FIG. 5B is a view showing the fourth embodiment. In FIG. 5A, a light 19 incoming to the outgoing surface of the LED light source 1G in the B light outgoing from the LED light source 1B is absorbed or reflected diffusely, is not effectively conducted to a side of the light pipe, and is wasted. Accordingly, in the present embodiment, as shown in FIG. 5B, the dichroic mirror 16 is provided in the front surface of the LED light source 1G. The dichroic mirror 16 is a mirror having a characteristic property of reflecting the B light and transmitting the G light, and as shown in FIG. 5B, and reflects the light 21 from the LED light source 1B which is originally wasted so as to conduct to the light pipe side, thereby making effective, while transmitting the light 20 from the LED light source 1G. In the same manner, the dichroic mirror 17 provided in the front surface of the LED light source 1R has a characteristic property of transmitting the R light and reflecting the B light and the G light, in the same manner as mentioned above, and effectively reflects the light which is originally wasted, while transmitting the light from the LED light source 1R.

In the present embodiment, the liquid crystal panel is used as the video display element, however, the arrangement of the dichroic mirror in front of the LED light source increases the light intensity incoming to the light pipe from the light source so as to improve the brightness, and the video display element is not limited to the liquid crystal panel in view of this meaning.

Embodiment 5

Figure 6:
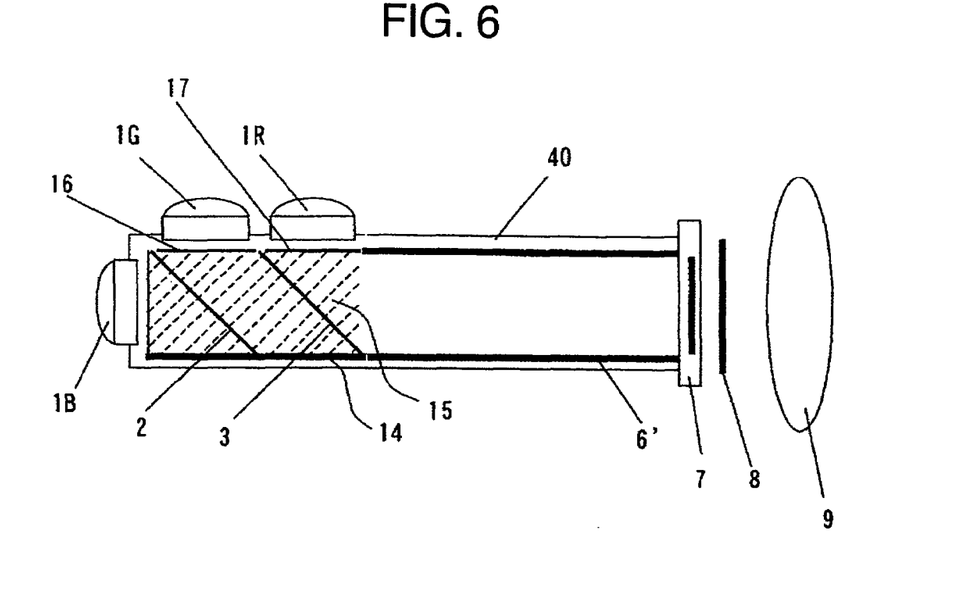
FIG. 6 is a top elevational view of an outline structure of an optical system of a projection type video display apparatus showing a fifth embodiment.

FIG. 6 is a top elevational view of an outline structure of an optical system of a projection type video display apparatus showing a fifth embodiment. The fifth embodiment is structured such that the polarization converting means constituted by the polarization separating mirror 4 and the mirror 5 and the baffle plate are deleted from the first to fourth embodiments mentioned above. FIG. 6 shows an example in which the polarization separating mirror 4, the mirror 5 and the baffle plate 13 are deleted from the structure in FIG. 5B.

In FIG. 6, the illumination light source constituted by the LED light sources 1R, 1G and 1B, the first combined mirror 2 and the second combined mirror 3, and a light pipe 6' are held and fixed to an optical case 40, and the liquid crystal panel 7 is arranged in the outgoing surface of the light panel 6'. In the present embodiment, since the polarization conversion is executed by an incoming side polarizing plate (not shown) attached to the incoming surface of the liquid crystal panel 7, it is possible to apply to the projection type video display apparatus having the low cost. In this case, FIG. 6 omits the intake hole and the exhaust hole serving as the ventilating hole of the cooling wind provided, for example, in the upper surface or the lower surface of the optical case 40.

Embodiment 6

Figure 7:
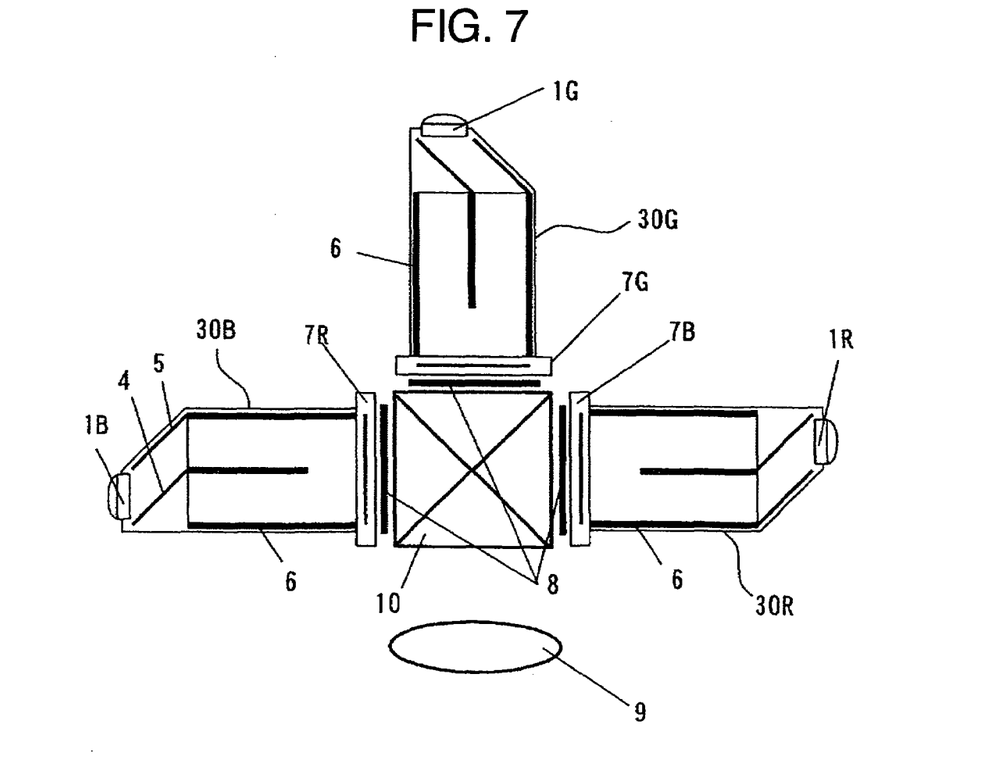
FIG. 7 is a top elevational view of an outline structure of an optical system of a three-plate projection type video display apparatus showing a sixth embodiment.

The structure of the present invention can be easily applied to the three-plate projection type video display apparatus employing three liquid crystal panel in correspondence to the RGB. The structure is shown in FIG. 7. In FIG. 7, since the three-plate system is employed, the means for combining the lights of three color LED light sources is not provided as is different from the invention mentioned above, but the projected image is formed by one projection lens 9 by combining the lights by using a combining prism 10 after passing through the liquid crystal panels 7R, 7G and 7B in correspondence to three colors. In this case, in the present embodiment, the structure shown in FIG. 3 is shown as one example of each of the illumination optical systems in each of the optical cases 30R, 30G and 30B, however, it goes without saying that the structure is not limited to this. Further, in order to easily illustrate, FIG. 7 omits the intake hole and the discharge hole serving as the ventilating hole of the cooling wind.

The description of the present invention mentioned above does not refer to the number of the LED constituting the LED light source, however, the present invention can be applied to both a case that each one RGB is provided and a case that a plurality of RGB are provided, in correspondence to a size of the liquid crystal panel, a thickness of the light pipe, and the like.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A projection type video display apparatus comprising:
a light pipe to which a light flux from a light source is conducted;
a video display element which is arranged so as to be approximately closely contacted with said light pipe and to which an outgoing light from said light pipe is irradiated; and
a projection lens for enlarging and projecting the graphic light from said video display element,
wherein said light pipe has a hollow structure formed by combining mirrors, and a wind path of a cooling wind for cooling said video display element is structured within said hollow structure, and
wherein a baffle plate for conducting said cooling wind to said video display element is arranged within the hollow structure portion of said light pipe.

2. A projection type video display apparatus comprising:
a light pipe to which a light flux from a light source is conducted;
a video display element which is arranged so as to be approximately closely contacted with said light pipe and to which an outgoing light from said light pipe is irradiated; and
a projection lens for enlarging and projecting the graphic light from said video display element,
wherein said light pipe has a hollow structure formed by combining mirrors, and a wind path of a cooling wind for cooling said video display element is structured within said hollow structure,
wherein said light source is constituted by RGB three color LED light source, and is structured such as to conduct a light flux from said LED light source to said light pipe after combining colors of the light flux by a color combining means, and
wherein a baffle plate for conducting said cooling wind to said video display element is arranged within the hollow structure portion of said light pipe.

3. A projection type video display apparatus as claimed in claim 1, wherein said baffle plate has a length equal to or more than one half of a length of said light pipe.

4. A projection type video display apparatus as claimed in claim 2, wherein said baffle plate has a length equal to or more than one half of a length of said light pipe.

5. A projection type video display apparatus as claimed in claim 1, wherein said baffle plate is constituted by a flat plate made of a light permeable material.

6. A projection type video display apparatus as claimed in claim 2, wherein said baffle plate is constituted by a flat plate made of a light permeable material.

7. A projection type video display apparatus as claimed in claim 1, wherein said baffle plate is constituted by a flat plate made of a light reflective material.

8. A projection type video display apparatus as claimed in claim 2, wherein said baffle plate is constituted by a flat plate made of a light reflective material.

9. A projection type video display apparatus as claimed in claim 1, wherein said light source is structured such as to be lighted in a time division manner for a predetermined time in each of RGB colors.

10. A projection type video display apparatus as claimed in claim 2, wherein said LED light source is structured such as to be lighted in a time division manner for a predetermined time in each of RGB colors.

11. A projection type video display apparatus as claimed in claim 9, further comprising a cooling fan constituted by a centrifugal fan,
wherein a wind path of a cooling wind for cooling the video display element is structured within the hollow structure portion of said light pipe in such a manner as to vent the cooling wind from said cooling fan to a first hole provided in one of portions near the incoming side opening portions of said light pipe, and exhaust from a second hole provided in the other near the incoming side opening portions of said light pipe.

12. A projection type video display apparatus as claimed in claim 10, further comprising a cooling fan constituted by a centrifugal fan,
wherein a wind path of a cooling wind for cooling the video display element is structured within the hollow structure portion of said light pipe in such a manner as to vent the cooling wind from said cooling fan to a first hole provided in one of portions near the incoming side opening portions of said light pipe, and exhaust from a second hole provided in the other near the incoming side opening portions of said light pipe.

13. A projection type video display apparatus comprising:
a light source constituted by three color light emitting diodes having red, green and blue colors (RGB);
a light combining unit which combines light fluxes from said light source;
a light pipe to which the combined light flux from said color combining means is conducted;

a video display element which is arranged so as to be approximately closely contacted with said light pipe and to which an outgoing light from said light pipe is irradiated; and a projection lens for enlarging and projecting the graphic light from said video display element, wherein said light pipe is integrally structured with an optical case serving as a structure body holding a plurality of optical elements including said color combining means and said video display element, and wherein said light pipe is structured by forming a mirror on an inner wall surface of the optical case.

14. A projection type video display apparatus as claimed in claim 13, wherein said optical case forms a mirror in an inner surface in accordance with a painting or a coating.

15. A projection type video display apparatus as claimed in claim 13, wherein a dichroic mirror reflecting or transmitting a specific wavelength is arranged in an incoming opening to said color combining means from at least one color LED light source in said three RGB colors, thereby passing through the light flux from said LED light source and reflecting the light flux from the other LED light sources.

16. A projection type video display apparatus as claimed in claim 14, wherein a dichroic mirror reflecting or transmitting a specific wavelength is arranged in an incoming opening to said color combining means from at least one color LED light source in said three RGB colors, thereby passing through the light flux from said LED light source and reflecting the light flux from the other LED light sources.

17. A projection type video display apparatus as claimed in claim 13, further comprising a cooling fan constituted by a centrifugal fan, and a baffle plate, wherein a wind path of a cooling wind for cooling the video display element is structured within the hollow structure portion of said light pipe in such a manner as to vent the cooling wind from said cooling fan to a first hole provided in one of portions near the incoming side opening portions of said light pipe, and exhaust from a second hole provided in the other near the incoming side opening portions of said light pipe.

18. A projection type video display apparatus comprising:

a light source constituted by three color light emitting diodes having red, green and blue colors (RGB);

a light pipe to which a light flux from said light source is conducted;

a video display element to which an outgoing light from said light pipe is irradiated;

a projection lens which enlarges and projects the video light from said video display element, a cooling fan constituted by a centrifugal fan; and a baffle plate, wherein said video display element is arranged so as to be approximately closely contacted to said light pipe, and wherein a wind path of a cooling wind for cooling the video display element is structured within the hollow structure portion of said light pipe in such a manner as to vent the cooling wind from said cooling fan to a first hole provided in one of portions near the incoming side opening portions of said light pipe, and exhaust from a second hole provided in the other near the incoming side opening portions of said light pipe.

19. A projection type video display apparatus comprising:

a light pipe to which a light flux from a light source is conducted;

a video display element which is arranged so as to be approximately closely contacted with said light pipe and to which an outgoing light from said light pipe is irradiated;

a projection lens for enlarging and projecting the graphic light from said video display element;

a cooling fan constituted by a centrifugal fan; and a baffle plate, wherein said light pipe has a hollow structure formed by combining mirrors, and a wind path of a cooling wind for cooling said video display element is structured within said hollow structure, and wherein said wind path of a cooling wind for cooling the video display element is structured within the hollow structure portion of said light pipe in such a manner as to vent the cooling wind from said cooling fan to a first hole provided in one of portions near the incoming side opening portions of said light pipe, and exhaust from a second hole provided in the other near the incoming side opening portions of said light pipe.

* * * * *